United States Patent [19]
Bantz et al.

[11] Patent Number: 4,731,606
[45] Date of Patent: Mar. 15, 1988

[54] METHOD FOR RAPID WINDOWING OF DISPLAY INFORMATION IN COMPUTER GRAPHICS

[75] Inventors: David F. Bantz, Chappaqua; Carlo J. Evangelisti, Jefferson Valley, both of N.Y.

[73] Assignee: International Business Machines Corporation, Armonk, N.Y.

[21] Appl. No.: 762,348

[22] Filed: Aug. 2, 1985

[51] Int. Cl.$^4$ .............................................. G09G 1/16
[52] U.S. Cl. .................................... 340/709; 340/721; 340/723; 340/747
[58] Field of Search ............... 340/721, 723, 747, 789, 340/724, 709, 802, 748

[56] References Cited

U.S. PATENT DOCUMENTS

| | | | |
|---|---|---|---|
| Re. 31,200 | 4/1983 | Sukonick et al. | 340/721 |
| 3,497,760 | 2/1970 | Kiesling | 340/748 |
| 3,816,726 | 6/1974 | Sutherland et al. | 340/747 |
| 4,491,836 | 1/1985 | Collmeyer et al. | 340/721 |
| 4,550,315 | 10/1985 | Bass et al. | 340/721 |
| 4,613,946 | 9/1986 | Forman | 340/720 |

OTHER PUBLICATIONS

Meagher, Donald, "Geometric Modeling Using Octree Encoding", Computer Graphics and Image Processing, 1982.
Doctor, Louis J. et al., "Display Techniques for Octree-Encoded Objects", IEEE CG&A, 1981, Jan.
K. Yamaguchi et al., "Octree-Related Data Structures and Algorithms", IEEE CG&A, 1981, Jan.

*Primary Examiner*—John W. Caldwell, Sr.
*Assistant Examiner*—Mahmoud Fatahi-Yar
*Attorney, Agent, or Firm*—Alexander Tognino; Jack M. Arnold

[57] ABSTRACT

A method for rapid windowing of display information in computer graphics is disclosed herein. Image display data is maintained in a hierarchical data tree structure. Small numbers of bits of data called summaries are maintained at the nodes of the tree. The large complete data image is divided into units called boxes. These boxes combine to form a master box for a particular window size. By searching the summaries for each box and locating the window within the master box, traversal of an entire subtree may be terminated quickly, proceed on only some of the subtrees, or proceed through to completion. A clipped image is rapidly generated that can be rendered to the viewer.

7 Claims, 15 Drawing Figures

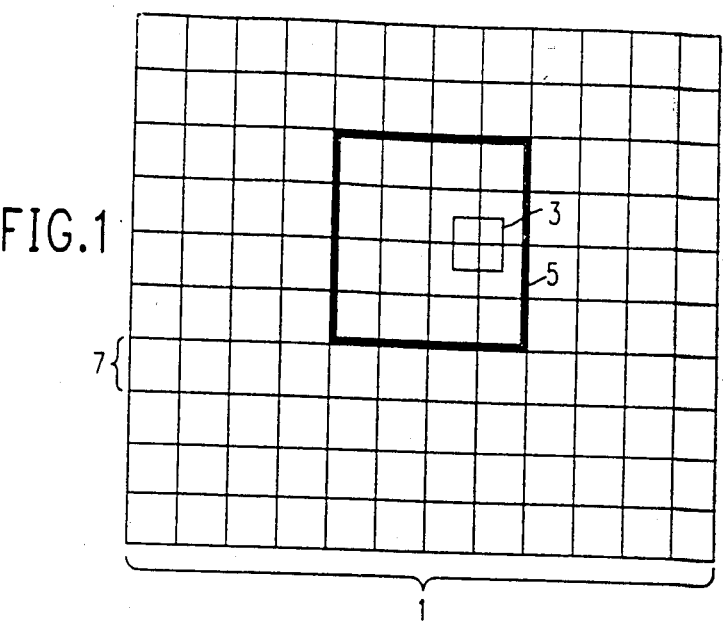
FIG.1
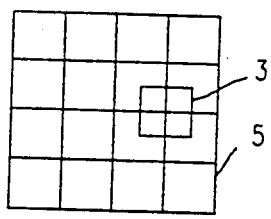
FIG.2.1
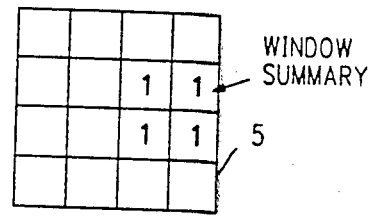
FIG.2.2
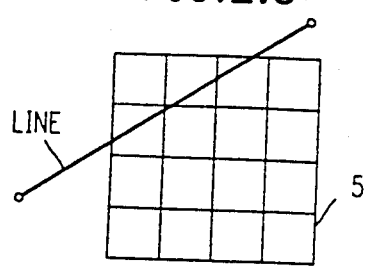
FIG.2.3
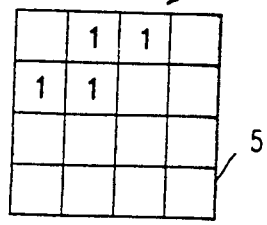
FIG.2.4

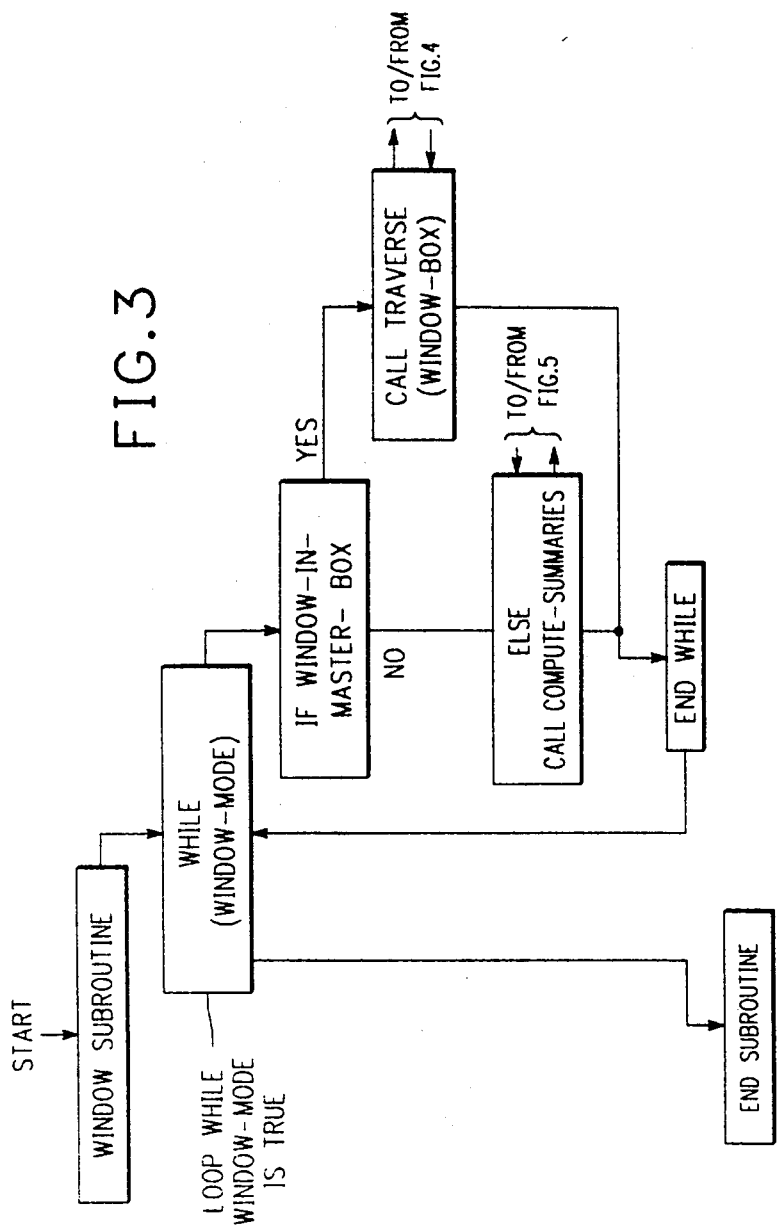

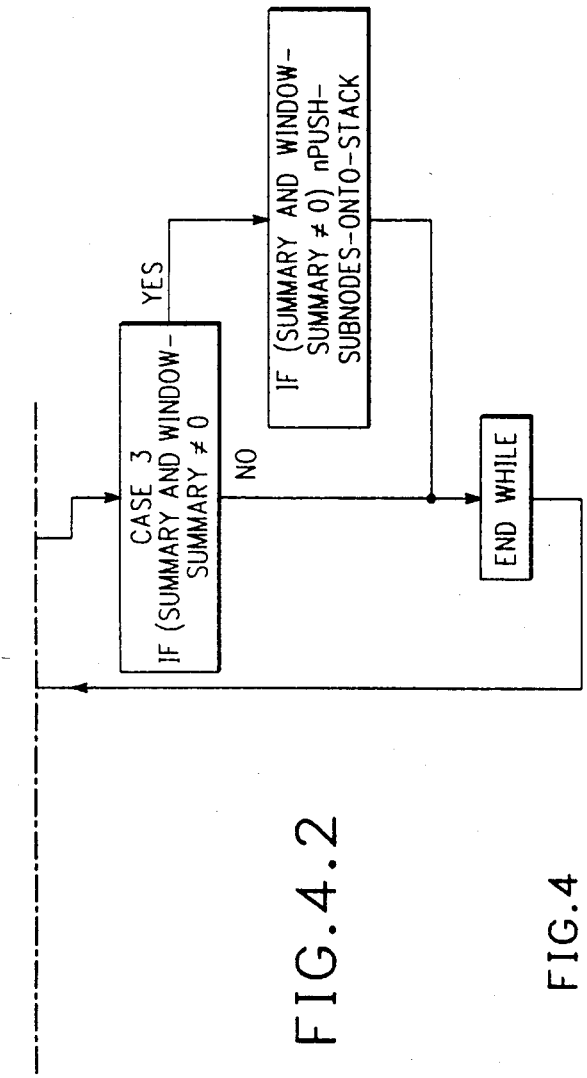

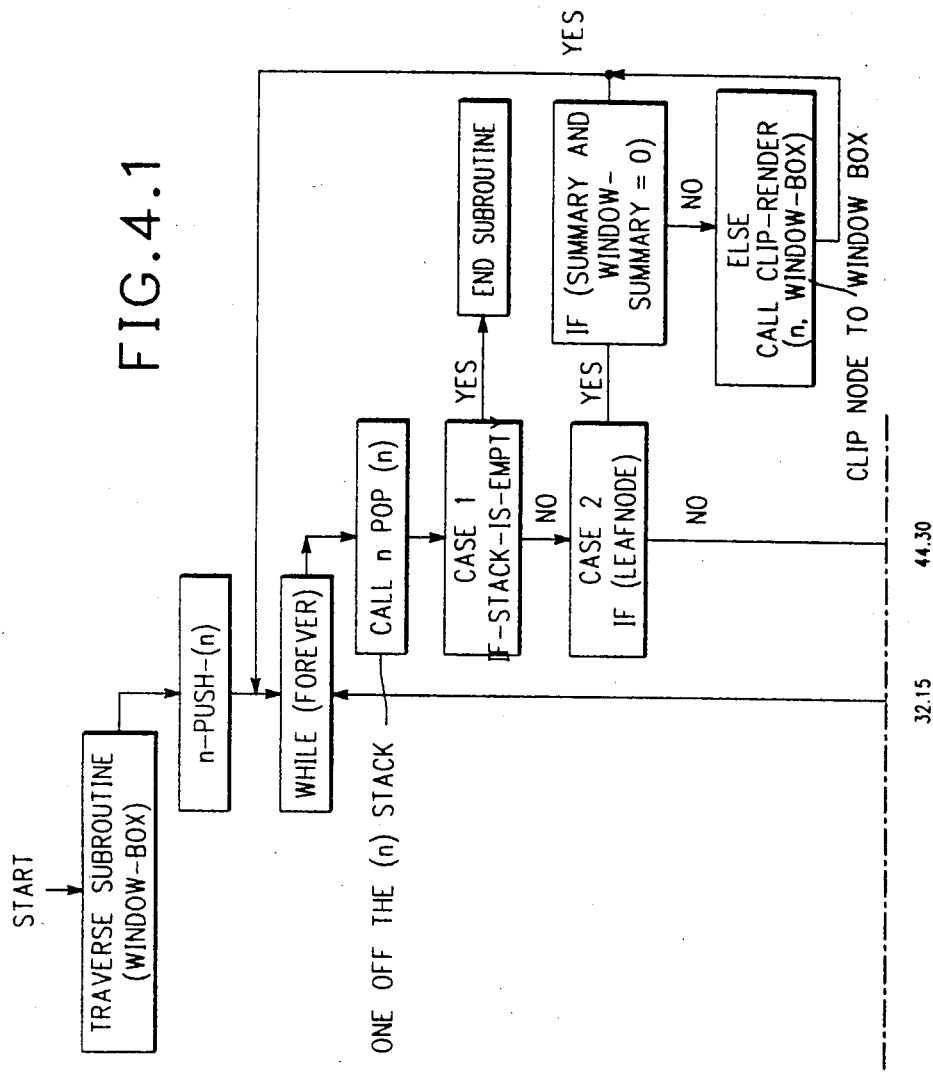

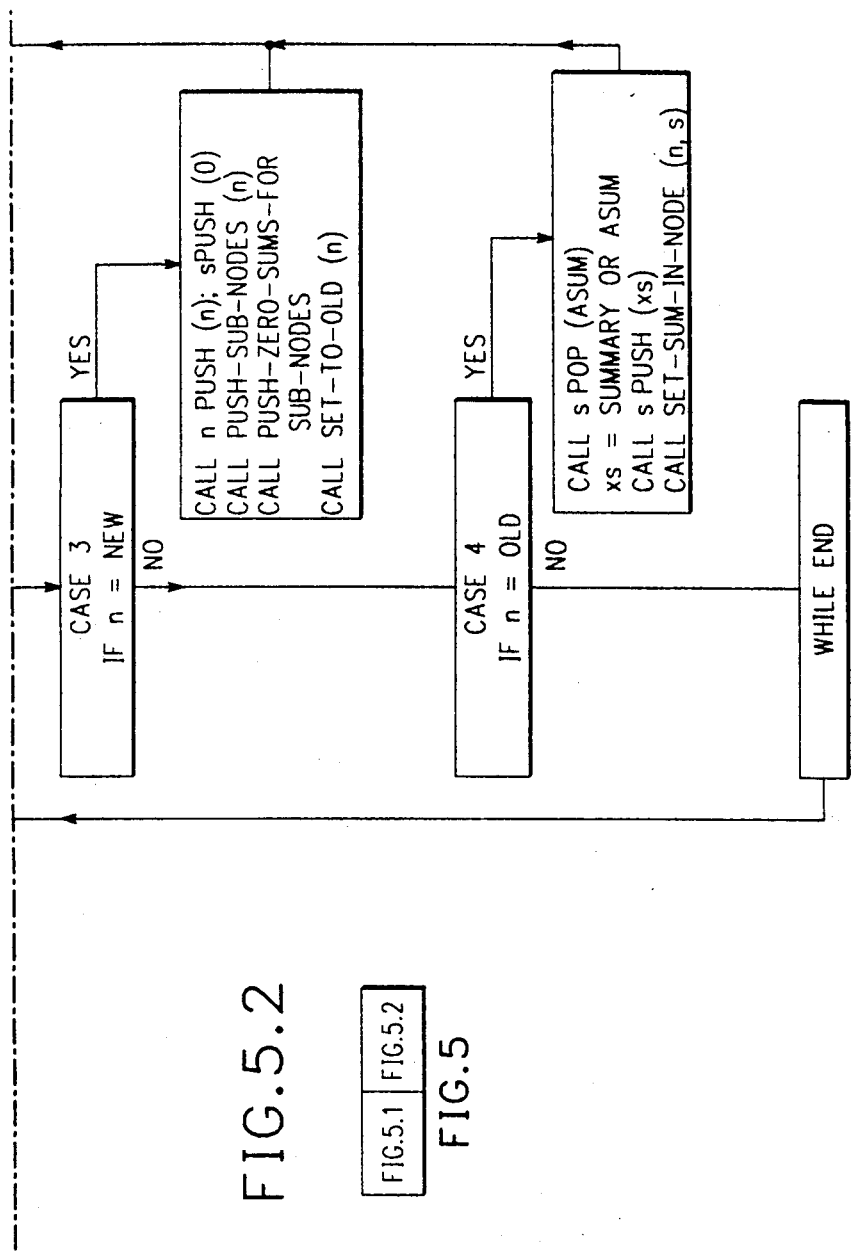

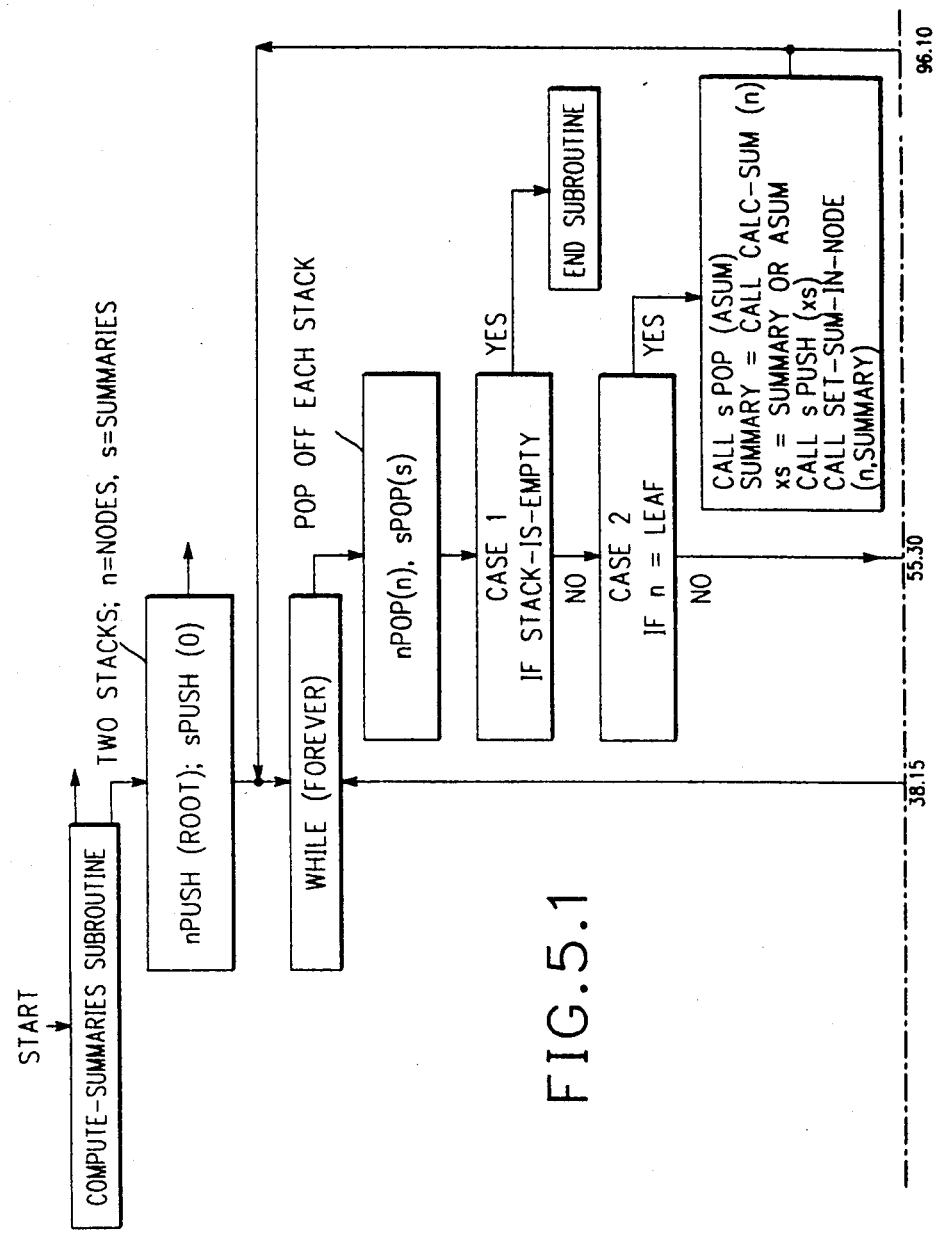
FIG.5.1

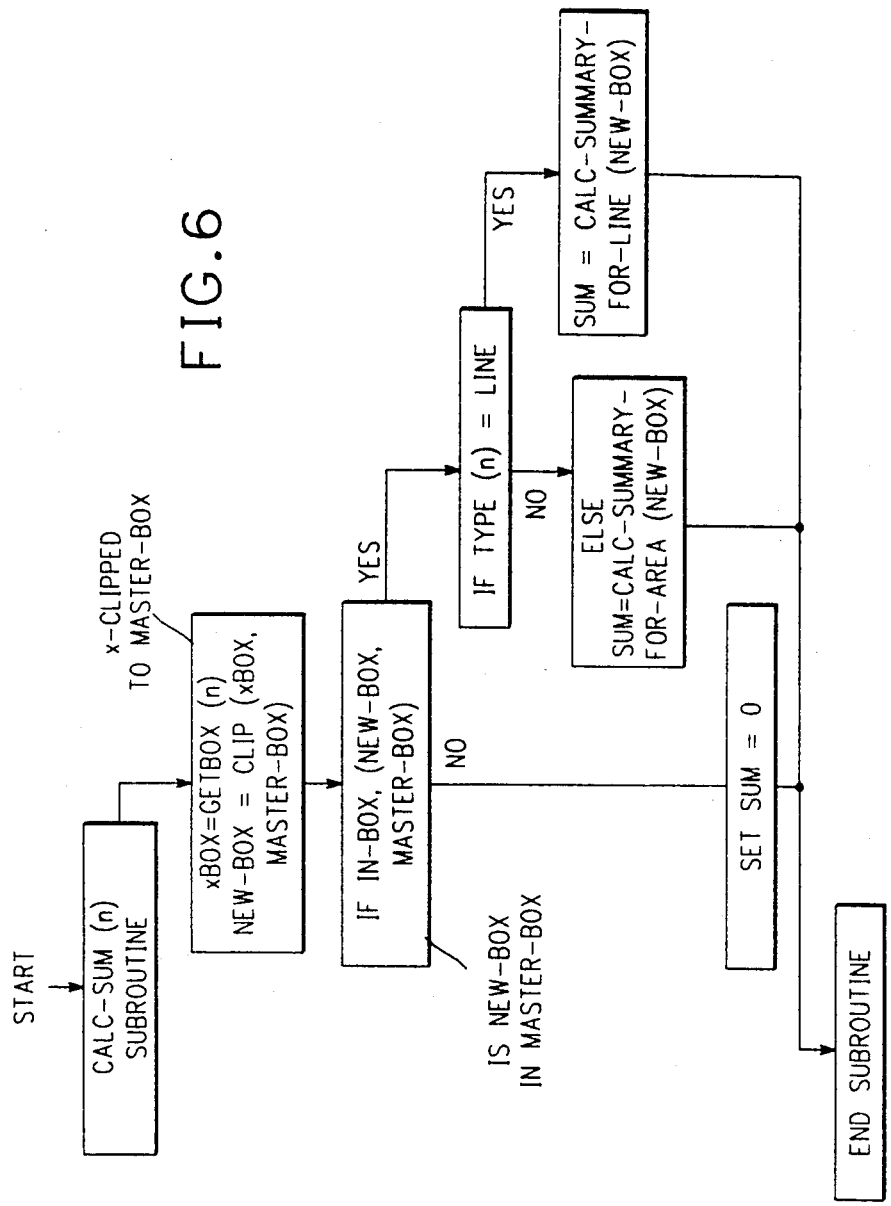

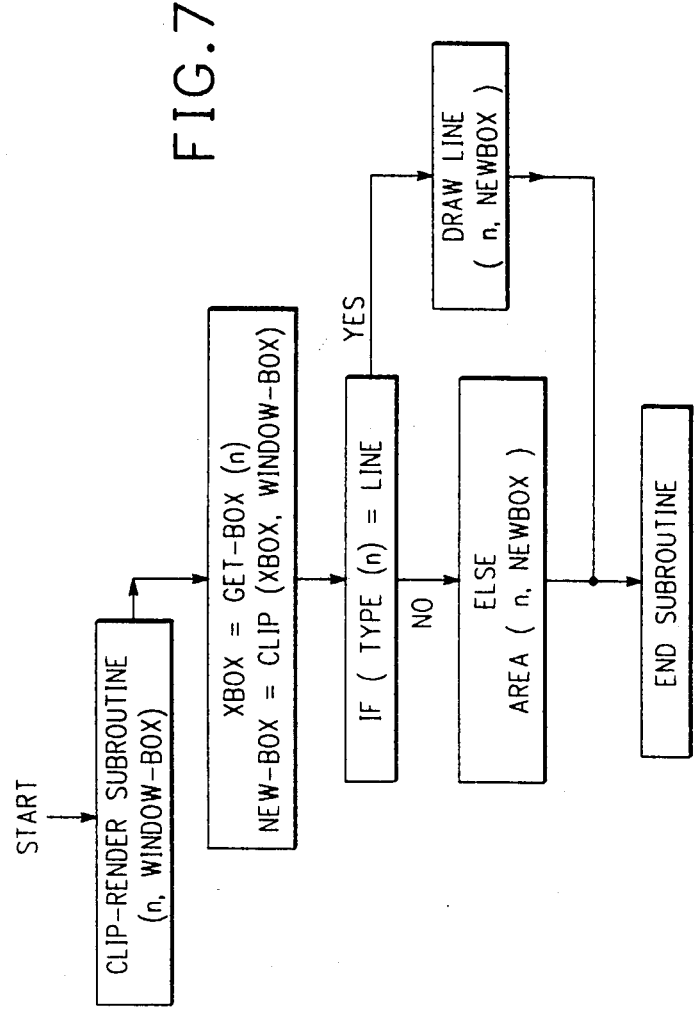

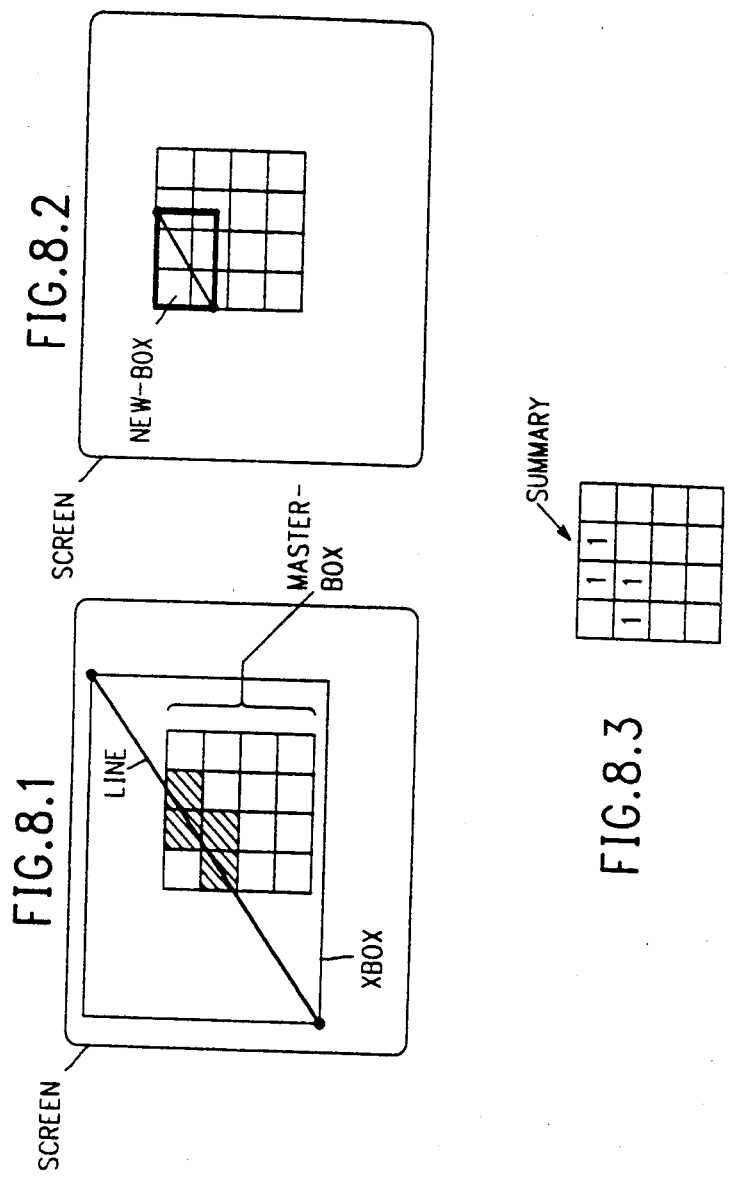

METHOD FOR RAPID WINDOWING OF DISPLAY INFORMATION IN COMPUTER GRAPHICS

BACKGROUND OF THE INVENTION

1. Field of the Invention

This invention relates to a method for processing image data in computer graphics. More particularly, this invention relates to a technique for rapid windowing of graphic display data.

2. Description of Related Art

In the application of graphic software programs to design tasks, there has been an increasing demand for rapid processing of larger and larger amounts of data. An important area of vital interest to program designers has been in methods by which the data to be presented to the viewer can be rapidly windowed to accommodate viewer initiated changes in the display request.

Typically, graphic display systems are known to keep subimages in a hierarchical data structure. When the hierarchical data structure is in the form of a data tree, the primitive images, such as, vectors, instances of characters or strings or arrays of characters and noncoded images, are placed at the leaves of the tree structure and attributes such as position and color maybe placed throughout the data tree structure.

Presently, graphic systems are designed to operate by placing a data window over a sheet which represents a large complete data image. The portion of the total image within the window is then presented to a viewport on a screen. However, when the window is moved dynamically, to produce an image change, the entire data structure must be traversed for a new image to be compiled. Thus, image changes require an enormous amount of data to be searched with resultant processing problems of slow reaction time, of tying up of large amounts of data storage and other handling inefficiencies etc.

One method for assembling the image change data has been to process the entire data structure to determine which primitives must be clipped and displayed. However, as the viewer requested information is usually only a small portion of the image data, this method is very time consuming, inefficient and wasteful of large memory.

In another method for assembling viewer requested information, the complete data image has been first transformed line by line to a display format. Every line is then converted to screen coordinates to determine which lines are visible to the user and which can be clipped. Once again, the method is extremely inefficient as unnecessary transformations are made to data not intended to be viewed with requisite sorting of non-visible lines by coordinates.

A related technique which has been incorporated into the above process, known as instance transformations, is a visibility test called boxing as described in *Principles of Interactive Computer Graphics* by Newman and Sproull, McGraw-Hill Book Company, 1979. In this method, an extent of visibility is maintained for sets of data subimages. The extent of visibility is determined by a bounding box created for the graphic primitives in the sets of subimages. The bounding box is, then, able to define the data to be displayed by comparing said box to the window characteristics and clipping out unnecessary data. This method, however, requires an extremely accurate specification of the bounding box by the programmer, an extremely difficult task when rotation or similar image transformations are possibly part of the requested information. At best the method led to a gross approximation of a bounding box and large amounts of unnecessary data were still required to be transformed and stored.

It is therefore an object of the present invention to develop a method for rapid windowing of display information in computer graphics in a processing efficient manner.

It is still a further object of the present invention for the windowing of the display information to be able to be accomplished with fast response times.

It is another object of the invention for the method for rapid windowing to be compatible and integrable with the other known graphic data rendering techniques.

SUMMARY OF THE INVENTION

A method for facilitating rapid windowing of display information is accomplished by dividing a large complete data image, a "sheet," into a number of smaller area boxes wherein the graphic primitives are placed in a hierarchical tree structure of precomputed data bits. The primitive images (i.e. vectors, instances of characters etc.) are at the leaves of the tree structure and attributes such as position and color may be placed throughout the data structure. In addition, small numbers of bits of data called summaries are maintained at the nodes of the tree, which summaries are the product of ORing the summaries of lower-level branches. A master box is further defined for the sheet whereby the data displayed on the screen to the user is established by a window less than or equal to the master box.

With panning of the screen by the user, the window box is moved relative to the sheet and relative to the master box. As long as the window remains in the master box, the hierarchical data tree is traversed for the boxes within the tree and the frame buffer is refreshed. Once the window crosses out of the master box, a new master box has to be created. Following, therefrom, new summaries are computed at each node indicating which boxes have graphic data to be rendered. Those nodes containing graphic data are then processed to define the extent of the image data. This image extend data is then clipped to the new master box to define a new box. The new box is subsequently clipped to the window and graphic primitives render the image to the viewer.

The foregoing and other objects, features and advantages of the invention will be apparent from the following more particular description of the invention as illustrated in the accompanying drawings.

BRIEF DESCRIPTION OF THE DRAWINGS

FIG. 1 shows the relationship between a sheet, box, master box and window.

FIGS. 2.1 and 2.2 show a summary for a window and FIGS. 2.3 and 2.4 show a line with a 4×4 master box, respectively.

FIG. 3 presents the flow chart for the window function.

FIGS. 4, 4.1 and 4.2 present the flow chart for the traverse function.

FIGS. 5, 5.1 and 5.2 present the flow chart for the compute-summaries function.

FIG. 6 presents the flow chart for the calc-sum function.

FIG. 7 presents the flow chart for the clip-render function.

FIGS. 8.1, 8.2 and 8.3 show a line image passing through a master box which lies on a screen.

DETAILED DESCRIPTION OF THE INVENTION

FIG. 1 shows the relationship of components for the system. A sheet 1 is a large area that contains image data, that could be rendered by line primitives or area primitives. The area primitive may be text, icons or image data specified as two coordinate pairs and the pixel data. The window 3 represents the area on the screen which the user is presently viewing. This window information is displayed on a viewport on a graphic terminal. The master box 5 is an area larger than or equal to the window 3. While the user stays within the master box 5 windowing is governed by one function called "traverse." When the user crosses the master box 5 a special computation involving the calculation of summaries takes place and then a new master box is established which is shifted in the direction the window was travelling. The window, master box and sheet are all multiples of the box size. The sheet may contain many of the smaller boxes 7. In the present description, the window 3 is the size of one box and the master box 7 is comprised of sixteen boxes.

Five basic functions comprise the rapid windowing method disclosed herein. The program, called "window", governs two processes in the system. One of the processes is traversal, which searches a tree structure containing a set of graphic primitives at the leaves. The nodes group the images into subimages. During traversal the screen is updated to reflect windowing within the master box.

The other process controlled by the window process is the computing of summaries which is required whenever the window has crossed the master box. A summary is a matrix of bits attached to a node. The summary of a node tells which boxes in the master box have graphic data to be rendered in that box. FIG. 2.4 shows a summary for a 4×4 master box. Each bit in the summary represents part of a line passing through a box as shown in FIG. 2.3. For each node in the tree, the summary associated, therewith, describes all the graphical data passing through the master box. The two other functions which complete the rendering task are "calc-sum" which calculates a summary and "clip-render" which clips and renders a line or area primitive on the screen as defined by the window.

The program, called "window," is described in FIG. 3. As indicated in the FIGURE, the program continues windowing or searching within a loop by a while statement until the user stops windowing. A test then determines if the window is in the master box which causes the function "traverse" to be executed and the window program to continue looping. If the window is not in the master box (i.e., it has passed through the master box), the function "compute-summaries" is executed, and later "traverse" is executed.

The function "traverse" is described in FIG. 4. The function begins by stacking the root node using the function "npush" and then entering into a loop. At the top of this loop, a node is popped off the node stack, and then one of three cases is obtained. The node is either (1) empty, (2) the node is a leaf or (3) the node has sub-nodes. In case one if the node is empty, the function is exited because the traversal is complete. In case two, if the node is a leaf node, one of two situations exist determined by two variables: summary and a mask variable called "window-summary."

An example of a window-summary is described in FIGS. 2.1 and 2.2 which shows a window within a master box and a corresponding window-summary that is essentially a summary with ones indicating where the window is on the master box. FIGS. 2.3 and 2.4 have already been described and show a master box with a line passing through it and a summary of that line indicated by a matrix of 1 and 0's placed in a 4×4 array. The similarity between a summary and a window-summary can thus be seen directly.

Now in case two above, if the summary ANDed with the window-summary is zero, (no graphic primitives in the window), sub-nodes can then be skipped, and the control returns to the top of the loop to start with the next node on the stack. Otherwise, the "clip-render" function is executed, which draws the line or writes an area and then control is returned to the top of the loop.

The third case is when a node has sub-nodes. A test is made to determine if summary ANDed with window-summary is nonzero. If it is nonzero it indicates that some part of the image under the node appears in the window. Therefore, all the sub-nodes under that node are pushed on the stack by a function called "push-sub-nodes."

Thus, the function "traverse," searches a graphic tree structure for leaves containing a graphic primitive that may need clipping and rendering. When summaries indicate rendering may be required then sub-nodes are processed. If the summaries indicate that no rendering is to be performed then the sub-nodes of that node are skipped.

The "compute-summaries" function described in FIG. 5, is executed when the window passes through the master box. This function accesses the tree data structure containing nodes and summaries associated at each node. In operation, two working stacks are used. One stack contains the nodes (n) and the other stack contains the summaries (s). In the first statement of this function the root node (n push (root)) and a summary of zero (spush (0)) are stacked to begin the traversal of the nodes in the tree. A loop is then entered with a while statement and a node and summary are popped. Then, one of four cases is obtained.

In case one if the node stack is empty the process is completed and the function returns to the window function of FIG. 3.

In case two if the node is a leaf, then a calculation of a new summary for the leaf is made and it is ORed with a previous summary on the stack. This is the mechanism by which a sibling node passes summary values to the next higher order sibling and finally to the parent node. The statements for processing a leaf node show that a summary named "asum" is popped and a new summary called "summary" is calculated for the node. (See FIG. 6 for calc-sum function). Summary ORed with asum (XS) is then pushed back on the stack and the program cycles to the top of loop. Also summary is set in the tree structure. The reason for this is that a summary value is placed on the stack for summaries (which is used to OR summaries among siblings and up the tree to parents) and is also placed in the tree structure (for use in windowing).

The third case governs the process by which the tree is traversed down to the leaves and also up toward the root. During the up traversal the ORing of summaries is performed. The bits of the ORing originates in the leaf nodes and are propagated up the tree. The mechanism used is that when a node is first placed on the stack it is considered a new node, and when processed as a new node becomes an old node. Later when the node is processed as an old node the ORing of summaries takes place up the tree.

In case three although n was popped above, it is pushed back on the stack and all the siblings of node are placed on the stack with the function "push-sub-nodes" which sets the sub-nodes to new. The function "push-zero-sums-for-sub-nodes" stacks zero summaries for the sub-nodes. Finally the attribute of the node is set to be an old node and control returns to the top of the loop.

In case four, an old node indicates traversal up the tree. Obtaining asum from the stack and summary (s) from a previous pop the two are ORed, placed on the summary stack and the summary value from the stack for that node is inserted in the tree structure and control returns to the top of the loop.

FIG. 6 describes the function "calc-sum" which calculates a summary only for a leaf node. (Case 2 of "compute-summary" function). First, the variable xbox is set by the function get box which obtains values from the tree structure. Xbox contains the extent (two coordinate pairs) for either a line or an area to be written on the screen.

Then, the function "clip" compares xbox with the master box and clips xbox to master box making a new box called new-box. Next, the function "in-box" determines whether new-box is in master box. If it is not, then its summary is set to zero and the remaining statements are skipped. If new-box is in the master box, the next test determines whether the leaf node is a line or an area primitive. If the node is a line, the function "calc-summary-for-line" determines for new-box the set of the boxes that are intersected by the line. If the leaf node primitive is an area rendering primitive, then another function called "calc-summary-for-area" examines all the boxes in the new-box which are covered by a full or part of the area to be rendered.

The last function is "clip-render." This is called whenever a line or an area primitive is to be drawn on the screen and clipping must be done before the actual rendering on the screen. FIG. 8.1 shows a line passing through a master box which lies on a screen. Xbox in FIG. 8.1 describes the extent of the line and new-box in FIG. 8.2 is a box clipped to the extents of the line. Finally, a summary in FIG. 8.3 is calculated using the new box which determines that four of the boxes in the summary have a line passing through them.

FIG. 7 describes the function "clip-render." The first two statements in FIG. 7 are the same as used in calc-sum. The coordinates of the extent of the line or area primitive are obtained and placed in xbox. With this function, however, xbox is clipped to the window-box. For assembling image to be rendered, graphic primitives for drawing a line or writing an area are invoked depending on the type of the leaf node.

Thus, while the invention has been described with reference to preferred embodiments thereof, it will be understood by those skilled in the art that various changes in form and details may be made without departing from the scope of the invention.

Having thus described our invention, what we claim as new, and desire to secure by Letters Patent is:

1. A method for facilitating rapid windowing of image data in computer graphics wherein the picture data stored in refresh memory is organized in a hierarchical tree structure made up of connected nodes such that the entire picture is represented by the top node and parts of the picture are represented in descending nodes from said top node so that at the most bottom nodes (leaves) of the tree, a graphic primitive, representing a vector, string of text, or image raster data, make up the displayable picture, including the steps of:

(a) dividing the displayable picture represented in a two-dimensional co-ordinate system into a number of boxes, (b) defining a master box greater than or equal to one of said boxes, (c) establishing a window of a preset number of said boxes less than or equal to the size of said master box such that said window represents the area of said picture which is to be displayed on the screen, (d) locating said window in relationship to said master box such that said window is contained in said master box, then (e) mapping bits of data called summaries into an NxN matrix, wherein NxN is equal to the number of boxes within the master box such that if a graphic primitive lies within a box within said master box then the summary has entered therein a one value and computing said summaries for branch nodes throughout said tree by ORing the summaries associated with the nodes of the tree and placing the result in an upper branch node and proceeding to OR the resulting summaries at the node branches of the tree in an ascending manner up the tree until the summary associated with the upper most node of the tree has been computed, (f) traversing said data tree from the summary for the top node of the tree through the summaries for said sub-nodes of the tree using the one value of the bits in said summaries to determine which of the branches of the tree contain graphic primitives at their nodes (g) identifying the location of the primitives within the grid of boxes, (h) clipping the graphic primitive to the size of said window box (i) displaying said clipped graphic primitives to render the image to the viewer.

2. A method according to claim 1 wherein the steps of locating said window in said master box and traversing continue in a loop until the window is moved out of the master box and then a different master box is defined around said window and new summaries for the boxes within the master box are calculated.

3. A method according to claim 1 wherein the ORing of the resulting summaries in an ascending manner up the tree further requires creating two stacks, one for node summaries and one for temporary summary values, such that node and sub-nodes summaries are put onto the node stack and temporary summary values are put onto said other stack, wherein said temporary summary values represent the ORing product of a node with its sub-nodes.

4. A method according to claim 3 for ORing said summaries wherein if the node on top of the node stack is a new node then its sub-nodes are to be stacked onto the node stack and said summary for said new node is ORed down the stack with said summaries for said sub-nodes changing said new node into an old node.

5. A method according to claim 3 for ORing said summaries wherein if the node on top of the node stack is a leaf node then that part of the leaf graphic primitive which impinges on the master box is used to determine the summary for said leaf node.

6. A method according to claim 3 for ORing said summaries wherein if the node on top of the node stack is an old node then summaries are calculated by ORing said old node with temporary summary values from said other stack.

7. A method according to claim 1 wherein the traversing searches a tree structure for leaf nodes containing a graphic primitive that may need clipping and rendering and when summaries indicate that rendering may be required then sub-nodes are processed otherwise the sub-node are skipped.

* * * * *